United States Patent
Ahn et al.

(10) Patent No.: US 8,599,322 B2
(45) Date of Patent: Dec. 3, 2013

(54) 2-DIMENSIONAL AND 3-DIMENSIONAL IMAGE DISPLAY DEVICE AND METHOD OF MANUFACTURING THE SAME

(75) Inventors: Byung Chul Ahn, Seoul (KR); Hoon Kang, Gumi-si (KR); Mi Kyoung Jang, Busan-Si (KR)

(73) Assignee: LG Display Co., Ltd., Seoul (KR)

( * ) Notice: Subject to any disclaimer, the term of this patent is extended or adjusted under 35 U.S.C. 154(b) by 1212 days.

(21) Appl. No.: 11/604,791

(22) Filed: Nov. 28, 2006

(65) Prior Publication Data
US 2007/0152998 A1    Jul. 5, 2007

(30) Foreign Application Priority Data
Dec. 29, 2005    (KR) .................. 10-2005-0132867

(51) Int. Cl.
*G02F 1/1335*    (2006.01)
*G02F 1/1347*    (2006.01)
*G02F 1/1343*    (2006.01)

(52) U.S. Cl.
USPC ............................. 349/15; 349/74; 349/147

(58) Field of Classification Search
USPC .......................................... 349/15, 74, 147
See application file for complete search history.

(56) References Cited

U.S. PATENT DOCUMENTS

| | | | | |
|---|---|---|---|---|
| 5,969,850 A * | 10/1999 | Harrold et al. | ............... | 359/320 |
| 6,525,798 B1 * | 2/2003 | Yamakita et al. | ............. | 349/141 |
| 7,058,252 B2 * | 6/2006 | Woodgate et al. | .............. | 385/16 |
| 7,199,845 B2 * | 4/2007 | Koyama et al. | ................. | 349/15 |

FOREIGN PATENT DOCUMENTS

| | | |
|---|---|---|
| JP | 2002-040410 | 2/2002 |
| KR | 10-2001-0040114 | 5/2001 |
| KR | 10-2004-0061594 | 7/2004 |
| KR | 10-2005-0071513 | 7/2005 |
| KR | 10-2005-0092541 | 9/2005 |

* cited by examiner

*Primary Examiner* — Uyen Chau N Le
*Assistant Examiner* — John M Bedtelyon
(74) *Attorney, Agent, or Firm* — McKenna, Long & Aldridge, LLP.

(57) ABSTRACT

Provided are a 2-dimensional and 3-dimensional image display device and a method of manufacturing the same. The display device includes: an image display panel including first and second substrates with a first liquid crystal layer interposed therebetween; a switching panel including third and fourth substrates with a second liquid crystal layer interposed therebetween; and a backlight unit for supplying light to the image display panel and the switching panel.

10 Claims, 11 Drawing Sheets

Translucent

Transparent

2-DIMENSIONAL AND 3-DIMENSIONAL IMAGE DISPLAY DEVICE AND METHOD OF MANUFACTURING THE SAME

This application claims the benefit of Korean Patent Application No. 10-2005-0132867, filed on Dec. 29, 2005, which is hereby incorporated by reference for all purposes as if fully set forth herein.

BACKGROUND OF THE INVENTION

1. Field of the Invention

The present invention relates to a display device, and more particularly, to a 2-dimensional and 3-dimensional image display device in which a color change versus a change in viewing angle is small, and a method of manufacturing the same.

2. Discussion of the Related Art

With the increasing demand for Internet, realistic communication, virtual reality and operation using an endoscope, there is an increasing need for the integration of computer, broadcasting and communication into one medium based on visualization of multimedia technology, and a 3-dimensional visualization of diagnosis and measurement results. As a result, there is an increasing need for a display device capable of displaying an image 3-dimensionally.

3-dimensional display technology is advantageous in various fields such as advertising, a home multimedia image display terminal, an image display terminal for simulation and education/training, a visualization image display terminal for precise measurement and diagnosis, a medical image display terminal, various image display terminals for watch and control, a 3-dimensional image monitor for video conferences and advertisements, a 3-dimensional television for broadcasting, an image display terminal for education/entertainment, manufacturing parts for various kinds of special environments, an image device for 3-dimensional games, and various head up displays for airplanes and vehicles.

The technologies required for a general 3-dimensional display device include the architectural design and manufacturing technologies for an optical plate, e.g., a lenticular lens plate or a microlens plate, for forming a visual field, and a drive control technology for reproducing a pixel pattern corresponding to the formation of the visual field on the display device.

Methods for displaying a 3-dimensional image is classified into two types of which one is a 2-viewpoint type and the other one is a multiple viewpoint type. The 2-viewpoint type displays respective images for left and right eyes, whereas the multiple viewpoint type display displays a binocular parallax image captured in wide variety of directions. For the multiple viewpoint type display, there is a problem where the resolution decreases in proportion to the number of viewpoints, whereas there is an advantage in that the degree of freedom of viewing position is higher so that it is possible to naturally see the 3-dimensional image.

Methods of focusing the image data for left and right eyes on the left and right eyes, respectively, include a parallax barrier method, a lenticular method or the like.

FIG. 1 is an exploded perspective view of a related art display device capable of 2-dimensional and 3-dimensional images, and FIG. 2 is a schematic view illustrating how to display the 3-dimensional image using the related art display device of FIG. 1.

Referring to FIG. 1, a liquid crystal display (LCD) device for displaying the 3-dimensional image using a parallax barrier panel 3 includes a backlight unit 1, an image display panel 5 for displaying an image by light generated from the backlight unit 1, and the parallax barrier panel 3 disposed between the backlight unit 3 and the image display panel 5, for displaying the 3-dimensional image.

The image display panel 5 includes an upper substrate on which a color filter layer is formed and a lower substrate on which a thin film transistor (TFT) as a switching device and a pixel electrode are formed, wherein a liquid crystal layer is interposed between the upper and lower substrates.

This method of displaying the 3-dimensional image using the parallax barrier panel 3 utilizes the principle of binocular parallax between left and right eyes, that makes it possible to see the image 3-dimensionally as when a human actually sees an object. Referring to FIG. 2, image data for the left eye and image data for the right eye are input into the image display panel 5 (minimally, two viewpoints). Therefore, it is possible to see the 2-dimensional image as the 3-dimensional image by intentionally focusing left and right eye images on a human's left and right eyes, respectively, by virtue of the parallax barrier panel 3.

That is, by inputting two sets of image data on a screen and making the left and right eyes separately focused on the left and right images, respectively, the 2-dimensional plane image can be perceived as a 3-dimensional image.

The parallax barrier panel 3 is divided into a plurality of barrier areas 4a for propagating the light toward a human's left eye, and a plurality of aperture areas 4b for propagating the light toward a human's right eye.

Assuming that a distance between the left and right eyes is about 65 mm and a distance within which a man can see the image ranges from 25 cm to 30 cm, for example, the parallax barrier panel 3 should be designed such that the left and right images are focused on the left and right eyes, respectively, within the distance in range of 25 cm to 30 cm apart from the image display panel 5.

However, the parallax barrier panel 3, which is used as a switch panel in the related art LCD device, uses a twistic nematic (TN) mode liquid crystal panel in which a common electrode is disposed on an upper substrate and a pixel electrode is disposed on a lower substrate generally. Thus, there are problems in that the viewing angle is quite narrow and the color change becomes large versus the viewing angle in displaying the 3-dimensional image (see FIG. 9A).

In particular, because a strict international standard spec for color uniformity exists, it is impossible to sell products if the color change becomes large.

Moreover, because a response speed of liquid crystal is slow in response to an electric field in the TN mode switching panel, it is a difficult to naturally display the 2-dimensional and 3-dimensional image according to the related art display device.

SUMMARY OF THE INVENTION

Accordingly, the present invention is directed to a 2-dimensional and 3-dimensional image display device and a method of manufacturing the same that substantially obviate one or more problems due to limitations and disadvantages of the related art.

An advantage of the present invention is to provide a 2-dimensional and 3-dimensional image display device capable of reducing color change versus a viewing angle by modifying an electrode structure of a switching panel into an in-plane switching (IPS) mode structure or a fringe field switching (FFS) mode structure, in which a pixel electrode and a common electrode are formed on a lower substrate.

Another advantage of the present invention is to provide a 2-dimensional and 3-dimensional image display device capable of displaying 2-dimensional and 3-dimensional images using a switching panel having a lenticular lens and a polymer dispersed liquid crystal (PDLC).

Additional features and advantages of the invention will be set forth in part in the description which follows, and in part will be apparent from the description, or may be learned by practice of the invention. The objectives and other advantages of the invention will be realized and attained by the structure particularly pointed out in the written description and claims hereof as well as the appended drawings.

To achieve these and other advantages and in accordance with the purpose of the present invention, as embodied and broadly described herein, a display device includes: an image display panel including first and second substrates with a first liquid crystal layer interposed therebetween; a switching panel including third and fourth substrates with a second liquid crystal layer interposed therebetween; and a backlight unit for supplying light to the image display panel and the switching panel, wherein the switching panel switches the display between a 2-dimensional display mode and a 3-dimensional display mode In another aspect of the present invention, a display device includes: an image display panel that displays an image; a lenticular lens that converts the image of the liquid crystal panel into a 3-dimensional image; and a switching panel between the liquid crystal panel and the lenticular lens, the switching panel using a polymer liquid crystal layer.

In further another aspect of the present invention, a method of manufacturing a display device includes: forming a common electrode on a substrate; forming a protective layer on the substrate with the common electrode; forming a pixel electrode on the substrate with the protective layer; and forming an alignment layer on the substrate in which the pixel electrode is formed and rubbing the alignment layer.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiment(s) of the invention and together with the description serve to explain the principle of the invention.

In the drawings.

DETAILED DESCRIPTION OF THE ILLUSTRATED EMBODIMENTS

Reference will now be made in detail to an embodiment of the present invention, examples of which is illustrated in the accompanying drawings. Wherever possible, the same reference numbers will be used throughout the drawings to refer to the same or like parts.

Figure 1:
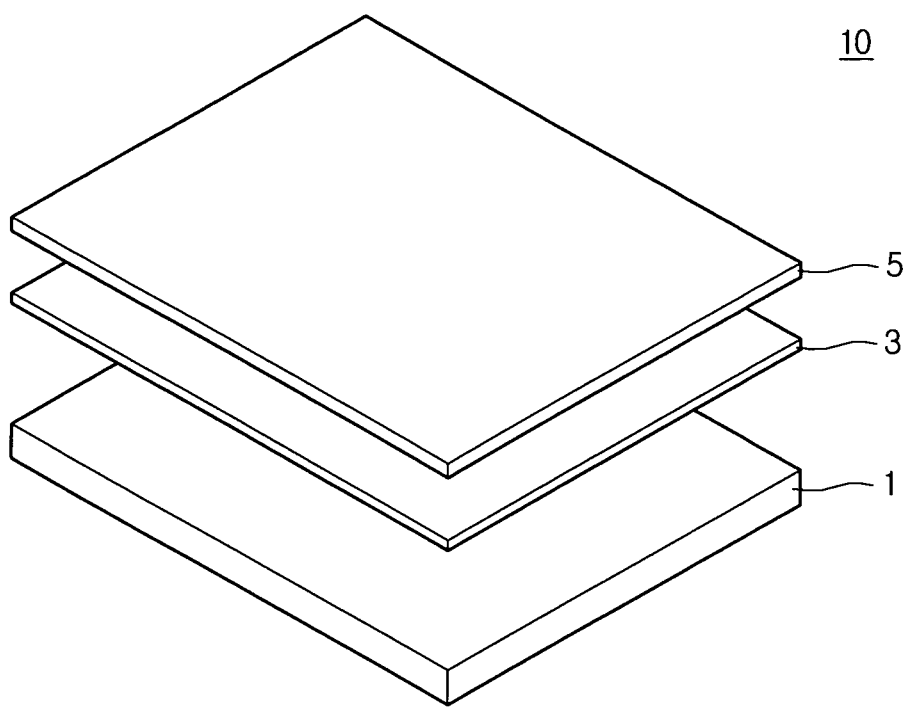
FIG. 1 is an exploded perspective view of a related art display device capable of displaying 2-dimensional and 3-dimensional images.
Figure 2:
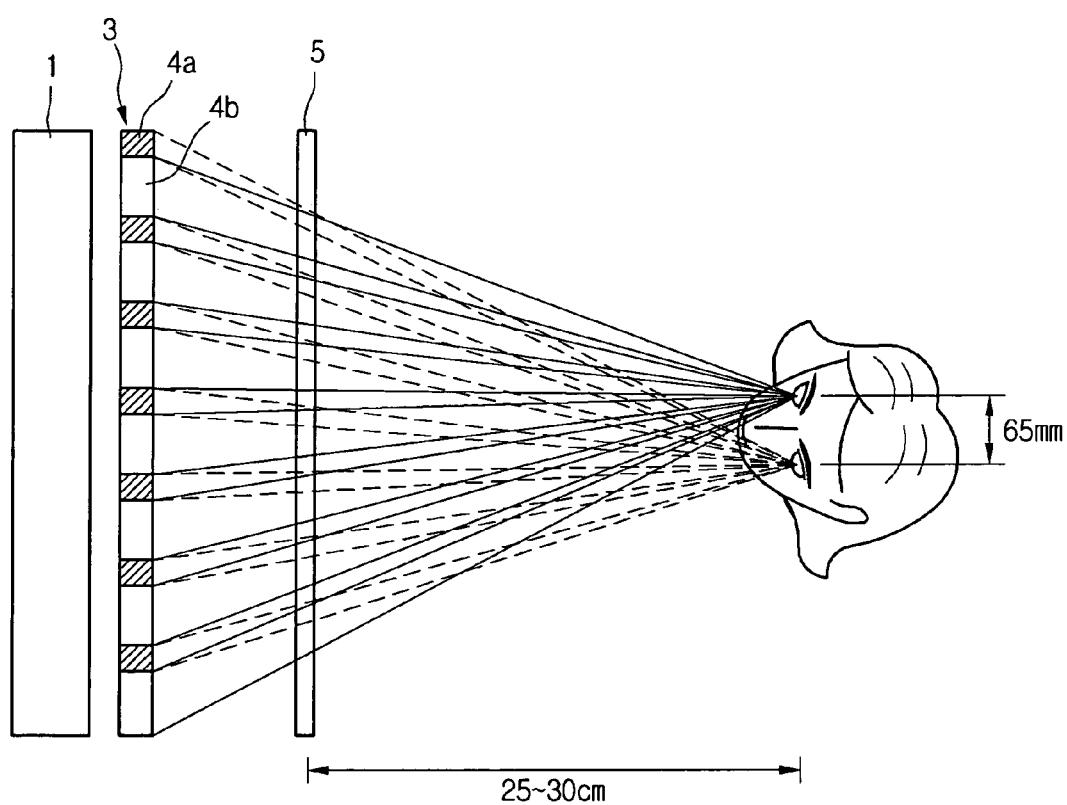
FIG. 2 is a schematic view illustrating how to display the 3-dimensional image using the related art display device of FIG. 1.
Figure 3:
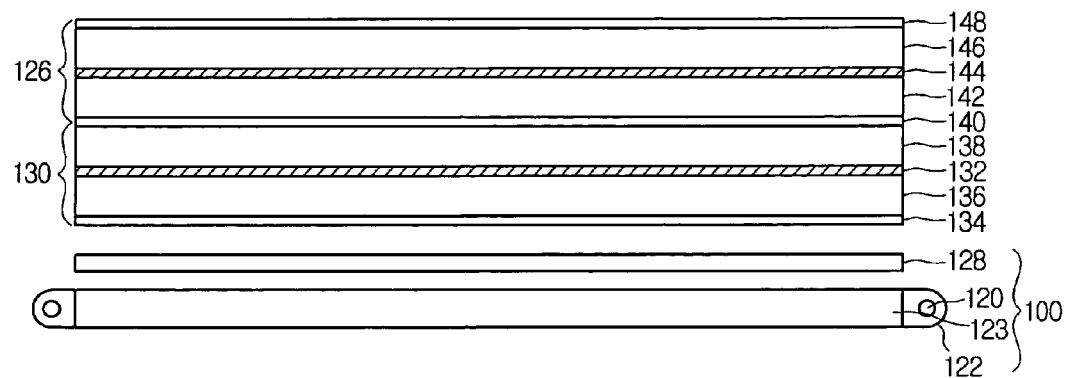
FIG. 3 is a schematic view illustrating a structure of a 2-dimensional and 3-dimensional image display device according to the present invention.

FIG. 3 is a schematic view illustrating a structure of a 2-dimensional and 3-dimensional image display device according to the present invention.

Referring to FIG. 3, a 2-dimensional and 3-dimensional image display device according to the present invention includes an image display panel 126 for displaying an image, a switching panel 130 acting as a switch for displaying a 3-dimensional image, and a backlight unit 100 for supplying light to the switching panel 130 and the image display panel 126. The backlight unit 100 includes a light guide plate 123, a lamp 120, a reflective plate 122 and a diffuser plate 128 for diffusing light.

The image display panel 126 includes a first substrate 146 and a second substrate 142 facing each other with a first liquid crystal layer 144 interposed therebetween, wherein first and second polarizing plates are disposed on outer surfaces of the first and second substrates 146 and 142, respectively.

Herein, the first substrate 146 is a color filter substrate where red, green and blue color filter layers are formed on a glass substrate. The second substrate 142 is a thin film transistor (TFT) substrate where a TFT as a switching device and a pixel electrode are formed on the glass substrate.

In particular, the image display panel 126 of the present invention may have various structures and operating modes such as a twistic nematic (TN) mode and a vertical alignment (VA) mode in which a common electrode is disposed on the color filter substrate and the pixel electrode is disposed on the TFT substrate. Alternatively, the image display panel 126 may have a structure and operating mode such as an in-plane switching (IPS) mode and a fringe field switching (FFS) mode in which the pixel electrode and the common electrode coexist on the TFT substrate.

The switching panel 130, which acts as a parallax barrier for displaying the 3-dimensional and 2-dimensional images, includes a third substrate 138 and a fourth substrate 136 facing each other with a second liquid crystal layer 132 interposed therebetween, wherein the second polarizing plates 140 is attached on an outer surface of the third substrate 138 and a third polarizing plate 134 is attached on the fourth substrate 134.

The second polarizing plate 140 acts as the polarizing plate for both the image display panel 126 and the switching panel 130, and it plays a role in maintaining a constant gap between the image display panel 126 and the switching panel 130 displaying the 3-dimensional image.

The third substrate 138 of the switching panel 130 is formed of glass substrate, and the fourth substrate 136 has the IPS mode structure or the FFS mode structure in which the pixel electrode and the common electrode are formed.

The detailed structure of the switching panel 130 will be illustrated with reference to FIG. 4.

The switching panel 130 may have two states of which one is a full white state where a white light passes through unaffected when all regions become transmissive regions, and the other is a state where a parallax barrier pattern is formed by blocking the transmissive region of a specific area.

When the switching panel 130 is in the full white state, a 2-dimensional image is displayed because the light generated at the backlight unit 100 is fully incident onto the image display panel 126.

However, when the transmissivity of a predetermined portion of the switching panel 130 is adjusted so as to form the parallax barrier pattern, binocular parallax in viewer's eyes results so that the image displayed on the image display panel 126 is embodied as the 3-dimensional image.

In particular, according to the present invention, because the switching panel 130 has an electrode structure with a wide viewing angle characteristic, it is possible to display the 2 or 3-dimensional image without a color change as the viewing angle varies.

Figure 4:
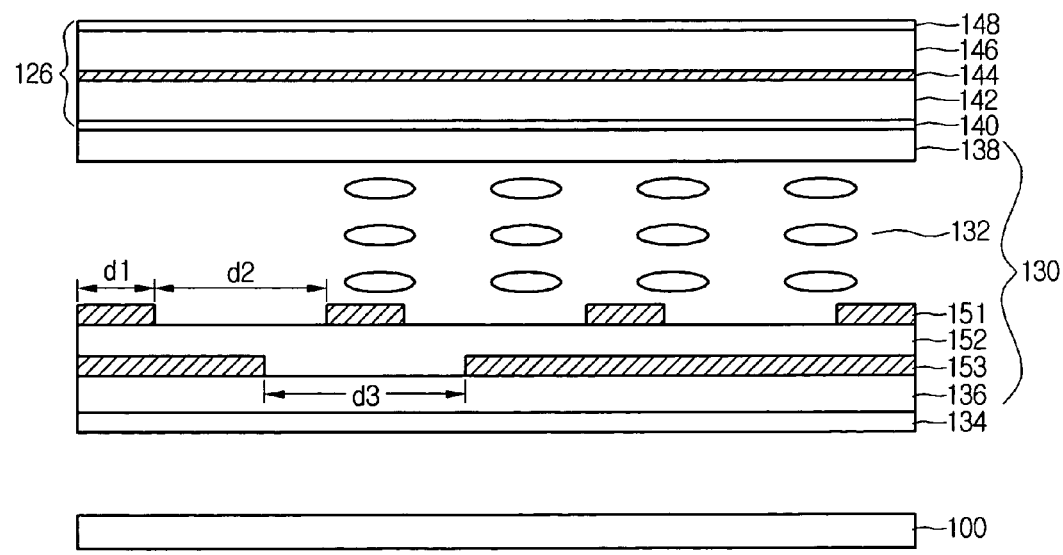
FIG. 4 is an enlarged sectional view illustrating a structure of the switching panel in the display device according to the present invention.

Referring to FIG. 4, the switching panel 130 is between the image display panel 126 and the backlight unit 100.

Reference numerals, which will not be illustrated thereinafter, denote like elements of FIG. 3 so that further descriptions will be omitted herein.

The switching panel 130 is configured such that the third substrate 138, i.e., the upper substrate, and the third substrate 136, i.e., the lower substrate, are attached to each other, wherein the second liquid crystal layer 132 is interposed therebetween.

A common electrode 153 is formed on the fourth substrate 136, wherein a protective layer 152 is formed on the common electrode 153. A pixel electrode 151 formed of a transparent metal is disposed on the protective layer 152.

The common electrode 153 may be formed of the same transparent metal as the pixel electrode 151 or formed of an opaque metal. A distance d1 denotes a width of the pixel electrode 151, and a distance d2 is a separation distance between the pixel electrodes 151. A distance d3 denotes a separation distance between the common electrodes 153.

In comparison with the related art display device in which the switching panel is a TN mode liquid crystal panel, the pixel electrode and the common electrode coexist on the lower electrode in the present invention so that it is possible to display full-white state uniformly with a wide viewing angle or to form the parallax barrier pattern a wide viewing angle characteristic.

Therefore, the light generated from the backlight unit 100 may be uniformly transmitted with a wide viewing angle when the display device is in full-white state to display the 2-dimensional image. Therefore, the present invention provides an advantageous effect of reducing the color change versus the viewing angle.

In addition, even if the parallax barrier pattern for displaying the 3-dimensional image is formed, the present invention also provides the excellent effect of reducing the color change versus the viewing angle, because of excellent viewing angle characteristic on transmissive and blocking regions.

Furthermore, by variously changing the structure of the pixel electrode 151 and the pattern of the pixel electrode 153 in the switching panel 130, the transmissivity is increased so that it is possible to further reduce the color change according to the viewing angle.

Figure 5A:
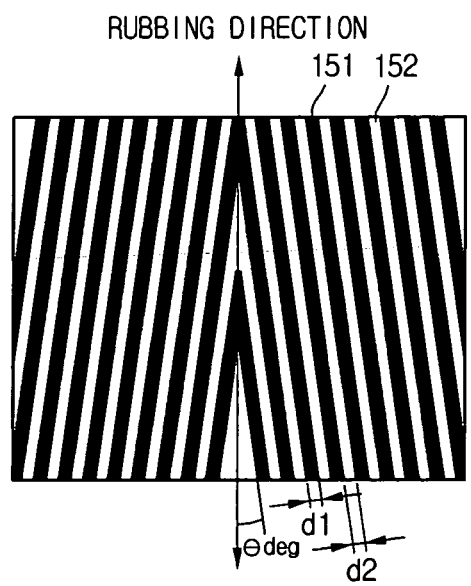
FIGS. 5A and 5B are schematic views illustrating a structure of a pixel electrode of the switching panel according to the present invention.
Figure 5B:
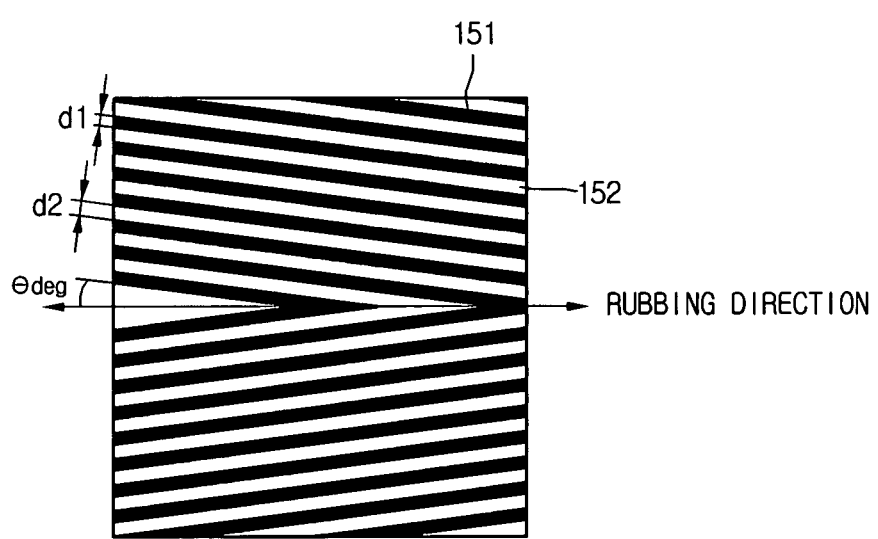

FIGS. 5A and 5B are schematic views illustrating a structure of a pixel electrode of the switching panel according to the present invention.

Referring to FIGS. 5A and 5B, a pixel electrode pattern of the switching panel according to the present invention is formed such that it maintains a predetermined tilt angle with respect to an alignment direction of an alignment layer.

That is, the pixel electrode of the switching panel is formed such that it maintains the predetermined angle θ with respect to an alignment direction of an alignment layer formed on the lower substrate of the switching panel. The pixel electrode 151 may be formed with a parallel or perpendicular pattern along a pixel area.

FIG. 5A illustrates a case where the pixel electrode 151 is patterned such that it is aligned in a vertical direction, and FIG. 5B illustrates a case where the pixel electrode 151 is patterned such that it is aligned in a horizontal direction. In FIGS. 5A and 5B, a reference numeral 152, denotations d1 and d2 represent the protective layer, the width of the pixel electrode and distance between the pixel electrodes, respectively.

The pattern of the pixel electrode 151 may have a tilt angle in range of 1° to 20° with respect to the alignment direction of the alignment layer, wherein the transmissivity characteristic may be the best when the tilt angle ranges from 3° to 5°. However, the angle for the best transmissivity characteristic may be changed according to the size of the panel, the liquid crystal, the electrode width, the distance between the electrodes.

Figure 6:
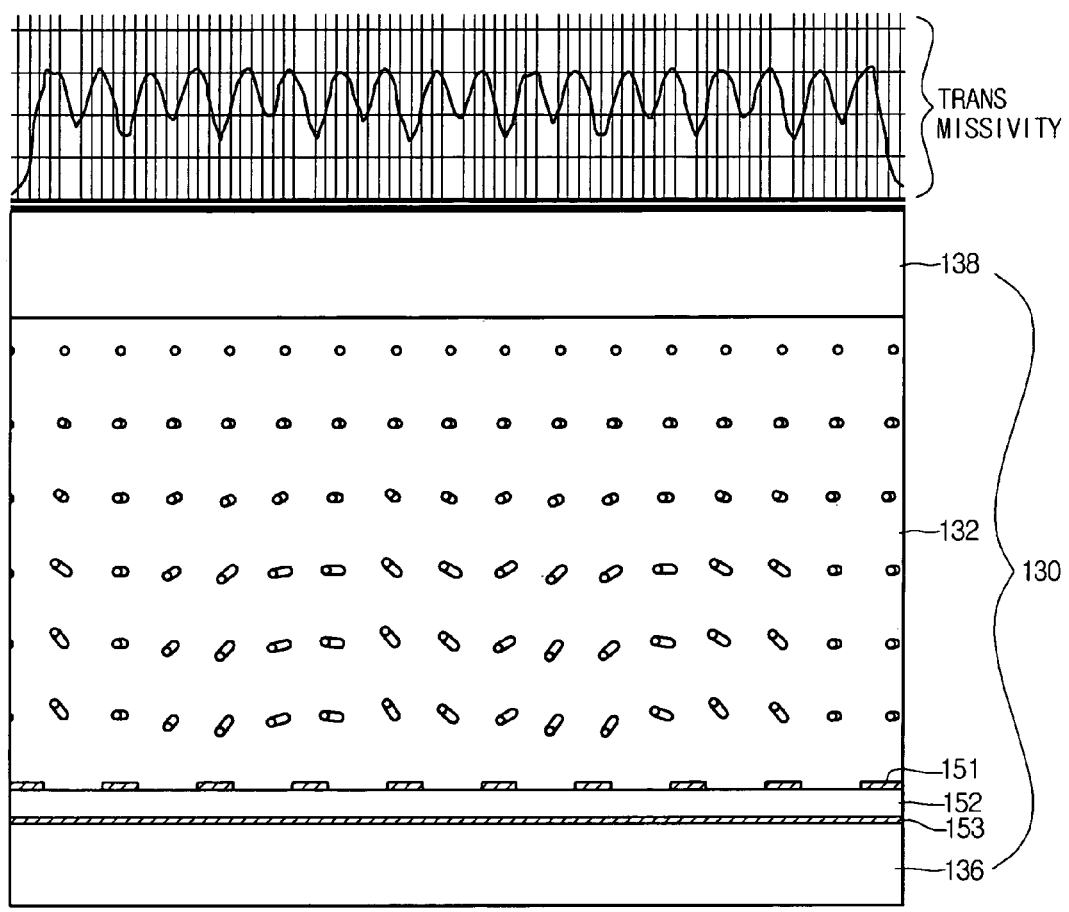
FIG. 6 is schematic view illustrating transmissivity characteristic as the switching panel of the present invention operates.

FIG. 6 is schematic view illustrating the transmissivity characteristic as the switching panel of the present invention operates.

Referring to FIG. 6, when the pixel electrode has the shape shown in FIGS. 5A and 5B and an electric field is applied to the common electrode 153 and the pixel electrode 151 of the switching panel 130, a uniform transmissivity characteristic in each common electrode 153 results.

Herein, reference numerals 138, 136 and 152, denote a third substrate, a fourth substrate acting as a lower substrate, and a protective layer, respectively.

When a voltage is applied to the pixel electrode 151 and the common electrode 153, a horizontal electric field is generated between the electrodes according to the electrode structure of the switching panel 130 so that liquid crystal molecules of the liquid crystal layer 132 rotate.

Because the liquid crystal molecules are horizontally arranged according to the horizontal electric field in the switching panel 130, the light is transmitted across a wide viewing angle.

Therefore, as illustrated in the drawings, the transmissivity is uniform across the common electrode 153. When the switching panel 130 has a high transmissive characteristic across a wide range of viewing angles, the color change is reduced across all of the viewing angles in a full-white state for a 2-dimensional image or a parallax barrier pattern state for 3-dimensional image.

Figure 7:
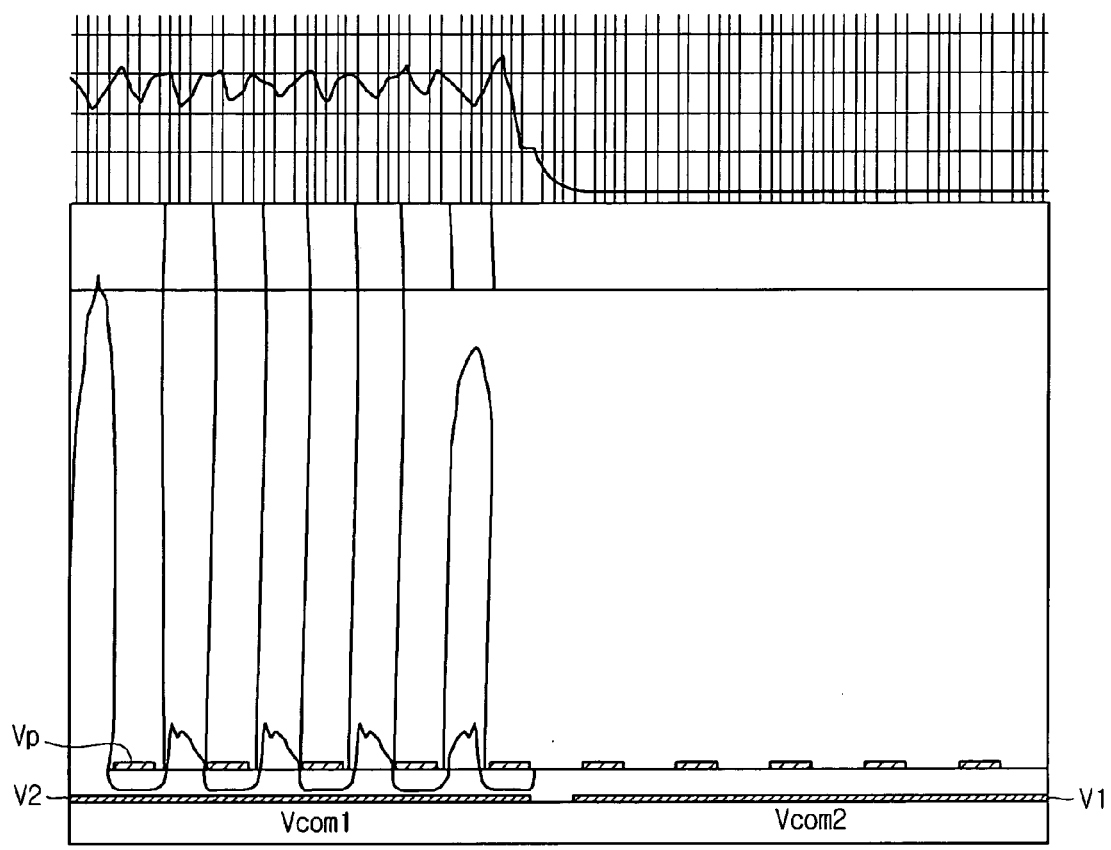
FIG. 7 is a schematic view illustrating how the transmissivity changes in response to a voltage applied to the switching panel according to the present invention.

FIG. 7 is schematic view illustrating the transmissivity change in response to a voltage applied to the switching panel according to the present invention. FIG. 7 illustrates the transmissivity characteristics of respective common electrode regions to which an electric field is applied and not applied.

When the light is transmitted in a region corresponding to one common electrode but is blocked in a region corresponding to the other common electrode, the parallax barrier pattern is formed so that it is possible to display the 2-dimensional image as a 3-dimensional image.

The driving characteristic of the switching panel may be expressed as a predetermined equation, i.e., Vcom=Vp+Vop, where Vcom, Vp and Vop denote a common voltage applied to the common electrode, a voltage applied to a pixel electrode, and a voltage generating an electric field by the operation of the switching panel, respectively.

A predetermined voltage Vop (=V2−Vp) is generated when a voltage applied to the first common electrode Vcom1 is V2 and the voltage applied to the pixel electrode is Vp. Thus, the light is transmitted by means of the electric field (R1 region).

Alternatively, when the voltage applied to the second common electrode Vcom2 is V1 that is equal to the voltage Vp applied to the pixel electrode, the electric field is generated between the common electrode and the pixel electrode so that the transmissivity is 0 (R2 region).

When the parallax barrier pattern is formed in which the transmissive regions and the blocking regions are alternately repeated along the common electrode, a human perceives a split image and binocular parallax to thereby perceive the image three-dimensionally.

Figure 8A:
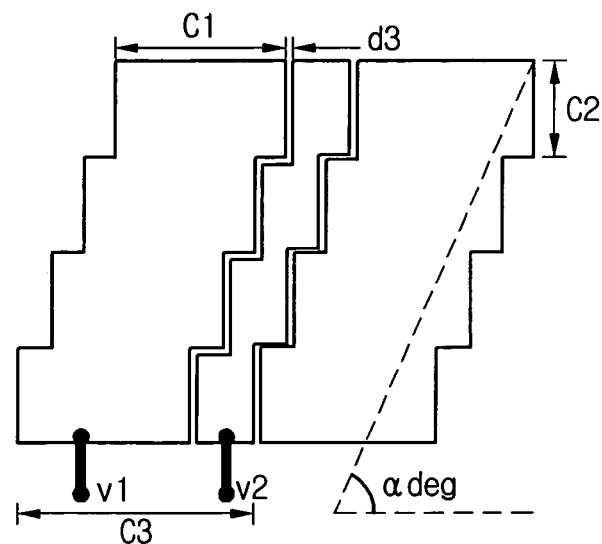
FIGS. 8A to 8C are schematic views illustrating a common electrode structure of the switching panel according to the present invention.
Figure 8B:
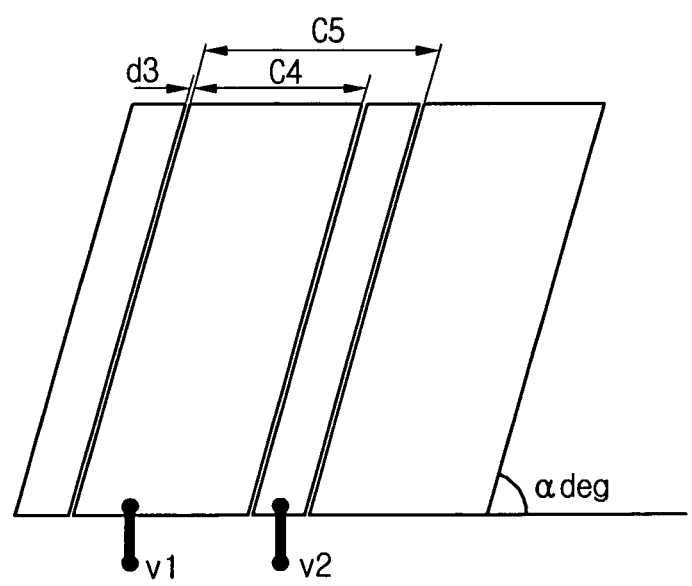
Figure 8C:
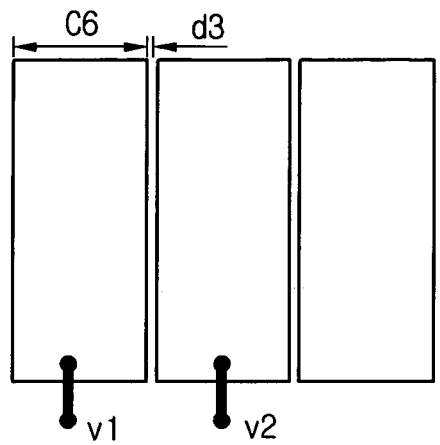

FIGS. 8A to 8C are schematic views illustrating a common electrode structure of the switching panel according to the present invention.

FIGS. 5A and 5B illustrate that the pattern of the pixel electrode is modified, while FIGS. 8A to 8C illustrate that the pattern of the common electrode is modified.

As illustrated in FIG. 8A, the common electrode is formed such that it is inclined at a predetermined angle (α deg) where both edge regions thereof are patterned in a step shape.

Herein, C1 indicates the width of the first common electrode Vcom1, C2 indicates a distance between steps in the common electrode, and C3 indicates the width of adjacent two common electrodes, i.e., the first common electrode Vcom1 and the second common electrode Vcom2. Herein, each common electrode is inclined at the predetermined tilt angle (α deg).

FIG. 8B illustrates a common electrode structure in which the common electrodes are inclined at the predetermined tilt angle (α deg) without the step structure, which is different from that of FIG. 8A. Meanwhile, FIG. 8C illustrates a common electrode structure in which the common electrodes having equal size are formed in parallel without a tilt. Herein, C6 indicates the width of each common electrode.

As described above, by variously forming the common electrode pattern of the switching panel, the parallax barrier pattern is formed in various shapes so that it is possible to enhance image quality of the 2 or 3-dimensional image according to the present invention.

Therefore, the tilt angle, width, or pattern shape of the common electrode may be selectively applied to each display device according to the size of the display device and the type of displayed image.

In addition, when forming the common electrode in various shapes, the transmissivity characteristic according to the viewing angle is improved so that it is possible to reduce the color change versus viewing angle.

In the present invention, because the switching panel used for displaying the 3 or 2-dimensional image has a structure for an IPS mode or FFS mode, and the pixel electrode pattern and the common electrode pattern are variously formed, it is possible to reduce the color change versus the viewing angle.

In the present invention, the pixel electrode patterns of FIGS. 5A and 5B and the common electrode pattern of FIGS. 8A to 8C may be used in the switching panel, respectively or simultaneously.

Figure 9A:
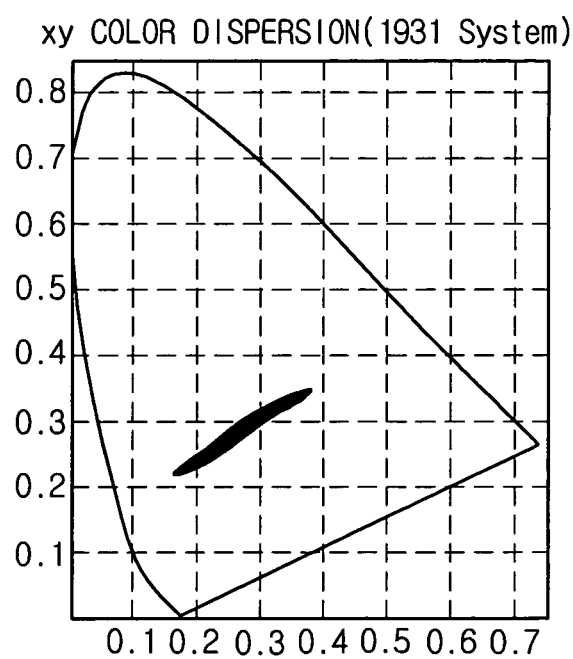
FIG. 9A is a graph illustrating color change versus viewing angle when using the related art switching panel.
Figure 9B:
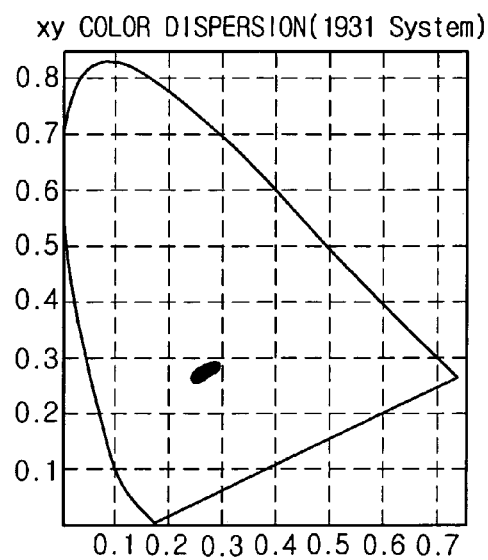
FIG. 9B is a graph illustrating color change versus viewing angle when using the switching panel according to the present invention.

FIG. 9A is a graph illustrating a color change versus viewing angle when using the related art switching panel, and FIG. 9B is a graph illustrating a color change versus a viewing angle when using the switching panel according to the present invention.

Referring to FIG. 9A, when applying the switching panel having the TN mode electrode structure according to the related art display device, it is shown that the color change becomes large according to the change of the viewing angle.

Referring to FIG. 9B, it can be seen that the color change versus the viewing angle is reduced, when applying the inventive switching panel having the IPS or FFS mode structure in which the pixel electrode and the common electrode are formed on the lower substrate.

In addition, as described above, when forming the pixel electrode pattern or the common electrode pattern, the transmissivity characteristic may be more enhanced so as to improve the image quality of the display device.

Figure 10:
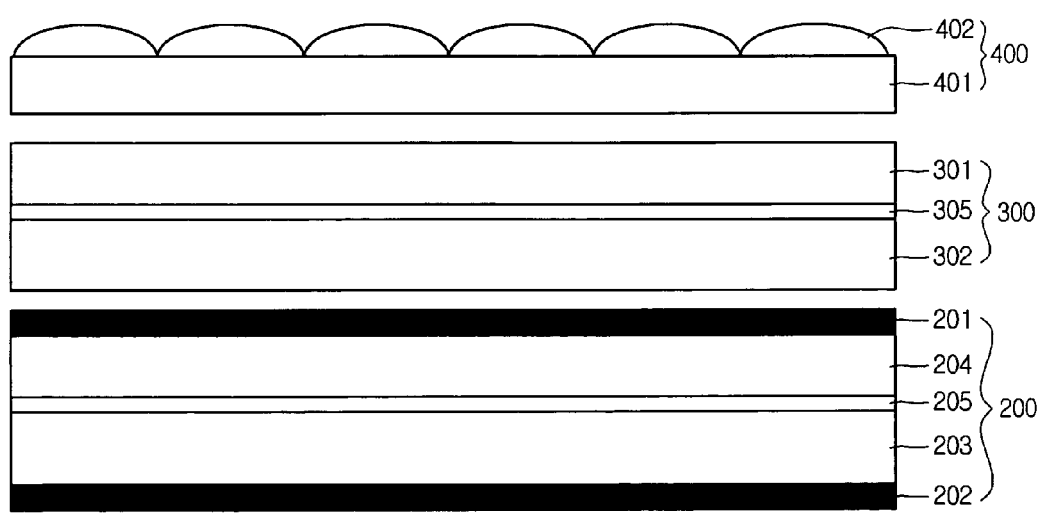
FIG. 10 is a sectional view illustrating a 2-dimensional and 3-dimensional image display device according to another embodiment of the present invention.

FIG. 10 is a sectional view illustrating a 2-dimensional and 3-dimensional image display device according to another embodiment of the present invention.

Referring to FIG. 10, the display device includes an image display panel 200 and a lenticular lens 400 for use in displaying the 3-dimensional image, wherein a switching panel 300 having a polymer dispersed liquid crystal (PDLC) is interposed therebetween.

The image display panel 200 includes a color filter substrate 204 and a TFT substrate 202 facing each other, wherein a liquid crystal layer 205 is interposed therebetween. Herein, an upper polarizing plate 201 is attached on an outer surface of the color filter substrate 204, and a lower polarizing plate 202 is attached on an outer surface of the TFT substrate 203.

The switching panel 300 includes an upper substrate 301 and a lower substrate 302 facing each other, wherein a polymer liquid crystal layer 305 is interposed therebetween. The upper and lower substrates 301 and 302 are formed of glass. The lenticular lens 400 includes an optical sheet 401 and a lens unit 402.

The polymer liquid crystal layer 305 contains polymer dispersed liquid crystal (PDLC) molecules, which are aligned at random when a voltage is not applied thereto. In addition, the polymer liquid crystal layer 305 causes scattering at an interface between media having different refractive indexes. On the contrary, when applying the voltage to the switching panel 300, the PDLC molecules are oriented in a predetermined direction and both the refractive indexes are equal to each other so that the polymer liquid crystal layer 305 becomes transparent.

Therefore, the display device according to another embodiment of the present invention provides an advantage where it is possible to alternately convert the 2-dimensional and 3-dimensional images by only on/off operation of the switching panel using the characteristic of the polymer liquid crystal layer 305.

Figure 11A:
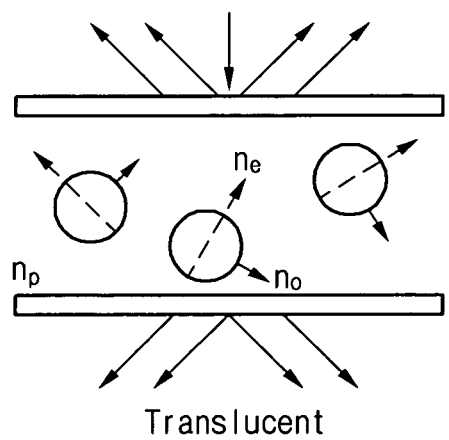
FIGS. 11A and 11B are schematic views illustrating the characteristic of the PDLC used in another embodiment of the present invention.
Figure 11B:
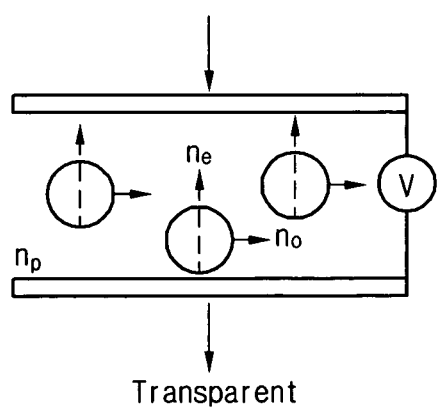

FIGS. 11A and 11B are schematic views illustrating the characteristics of the PDLC used in another embodiment of the present invention.

Research has led to the development of PDLC displays capable of displaying an image with high contrast and fast response speed in spite of the low driving voltage used in the LCD device.

The PDLC, which is a kind of liquid crystal cell used in the LCD device, has a peculiar property where the transmission of light is controlled according to the intensity of light scattering and the polarizing plate is not needed.

In addition, the PDLC has an advantageous property that it is possible to display a sharp image with a driving voltage as low as that of existing liquid crystal displays regardless of viewing direction.

The PDLC has such a high contrast in spite of a low driving voltage because the liquid crystal is specifically dispersed as a network structure. Because the PDLC achieves high contrast, it is possible to display the sharp image quality without an application of a compensation technology for the viewing angle because the PDLC operates by a light-scattering mechanism, which is different from the existing liquid crystal.

As illustrated in FIGS. 11A and 11B, the PDLC layer is translucent because the liquid crystal molecules are arranged at random when the voltage is not applied thereto. However, when the voltage is applied, the PDLC molecules are oriented in a predetermined direction along the electric field so that the PDLC layer becomes transparent.

Figure 12:
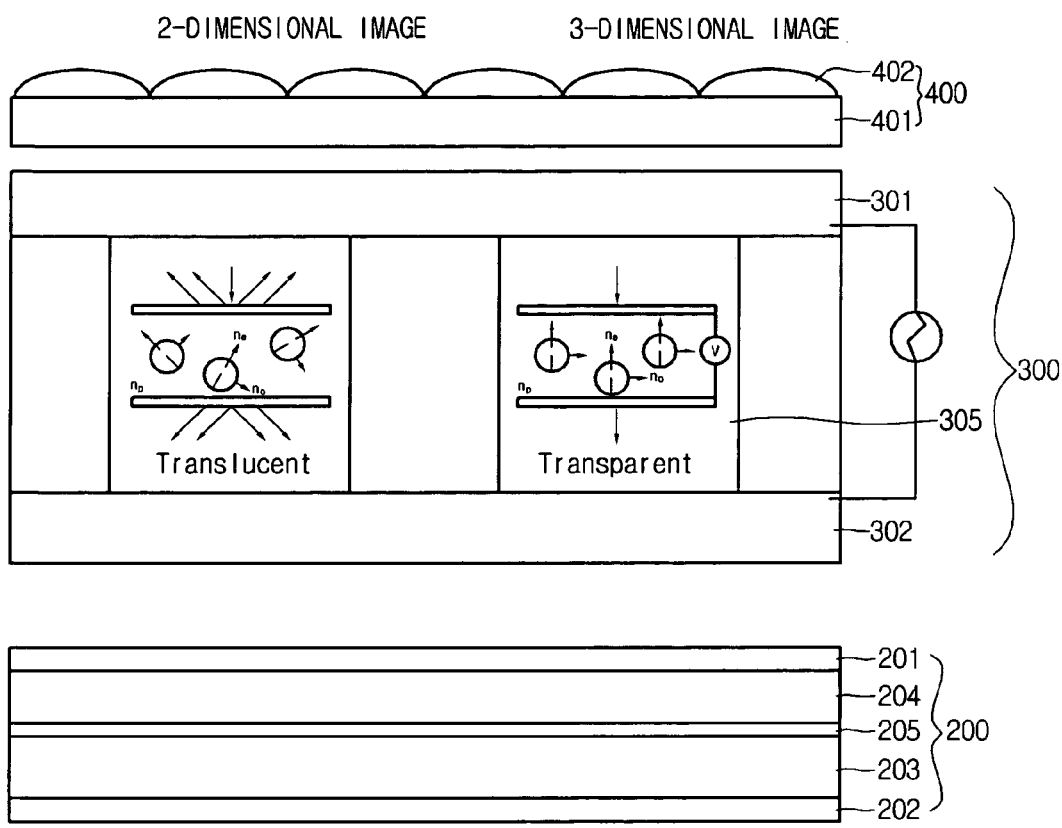
FIG. 12 is a schematic view illustrating an operation of the 2-dimensional and 3-dimensional image display devices according to another embodiment of the present invention.

FIG. 12 is a schematic view illustrating the operation of 2-dimensional and 3-dimensional image display devices according to another embodiment of the present invention.

Referring to FIG. 12, the display device of the present invention can switch between the 2-dimensional and 3-dimensional images simply by the simple switching operation using the characteristic of PDLC.

Because the display device of FIG. 12 has the same structure as the display device of FIG. 10, further descriptions for common elements will be omitted herein. Thereinafter, a method of operation will be illustrated in detail.

When the lenticular lens 400 is merely disposed in front of the liquid crystal panel 200, the image display panel 200 for displaying the 2-dimensional image generates a binocular parallax conversion for each image while the light passes through the lenticular lens 400, to thereby display a 3-dimensional image.

In the present invention where the switching panel 300 having the polymer liquid crystal layer 305 of PDLC is inserted between the lenticular lens 400 and the liquid crystal panel 200, the 2-dimensional image of the image display panel 200 is input to the lenticular lens 400 thereby displaying the 3-dimensional image when the voltage is applied to the switching panel 300 so that the polymer liquid crystal layer 305 is transparent.

On the other hand, when a voltage is not applied to the switching panel 300, the switching panel 300 becomes translucent and scattered images of the image display panel 200 are input to the lenticular lens 400, thereby displaying a 2-dimensional image.

In the related art display device, it is not possible to alternately display the 2-dimensional and 3-dimensional images but only to display the 3-dimensional image, when only the lenticular lens 400 is disposed in the liquid crystal panel 200. However, according to the present invention, it is possible to selectively display 2-dimensional and 3-dimensional images through a simple switching operation by disposing the switching panel 300 using the PDLC between the image display panel 200 and the lenticular lens 400.

As described in detail as above, the present invention can reduce the color change versus viewing angle by modifying the structure of the switching panel used for displaying the 3-dimensional image into the IPS mode or the FFS mode structure.

In addition, the present invention provides an advantageous effect of displaying 2-dimensional and 3-dimensional images using the switching panel using the lenticular lens and the PDLC.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

What is claimed is:

1. A display device comprising:
    an image display panel including first and second substrates with a first liquid crystal layer interposed therebetween;
    a switching panel including third and fourth substrates with a second liquid crystal layer interposed therebetween; and
    a backlight unit for supplying light to the image display panel and the switching panel,
    wherein the switching panel switches the display between a 2-dimensional display mode and a 3-dimensional display mode,
    wherein a pixel electrode and a common electrode are formed on the fourth substrate, wherein the fourth substrate is made of glass,
    wherein a protective layer is formed between the pixel electrode and the common electrode,
    wherein the switching panel is formed between the backlight and the image display panel, and
    wherein the second liquid crystal layer of the switching panel forms a parallax barrier including a transmissive region and a blocking region according to an applied voltage to the second liquid crystal layer between the pixel electrode and the common electrode so as to switch the 2-dimensional display mode to the 3-dimensional display mode,
    wherein the pixel electrodes are formed such that they are symmetrically inclined at a predetermined angle with respect to an alignment direction of an alignment layer formed on the fourth substrate.

2. The display device according to claim 1, wherein the first substrate is a color filter substrate.

3. The display device according to claim 1, wherein the second substrate is a thin film transistor substrate.

4. The display device according to claim 1, wherein the third substrate is a glass substrate.

5. The display device according to claim 1, wherein the pixel electrode and the common electrode are formed of a transparent metal.

6. The display device according to claim 1, wherein the pixel electrode is formed of a transparent metal but the common electrode is formed of an opaque metal.

7. The display device according to claim 1, wherein an angle between the pixel electrode and the alignment direction is in a range of 3° to 5°.

8. The display device according to claim 1, wherein the common electrode is formed such that it is inclined at a predetermined tilt angle.

9. The display device according to claim 1, wherein an additional common electrode has a different width than the common electrode.

10. The display device according to claim 1, wherein the common electrode has a step-shaped structure.

* * * * *